Figure 1:
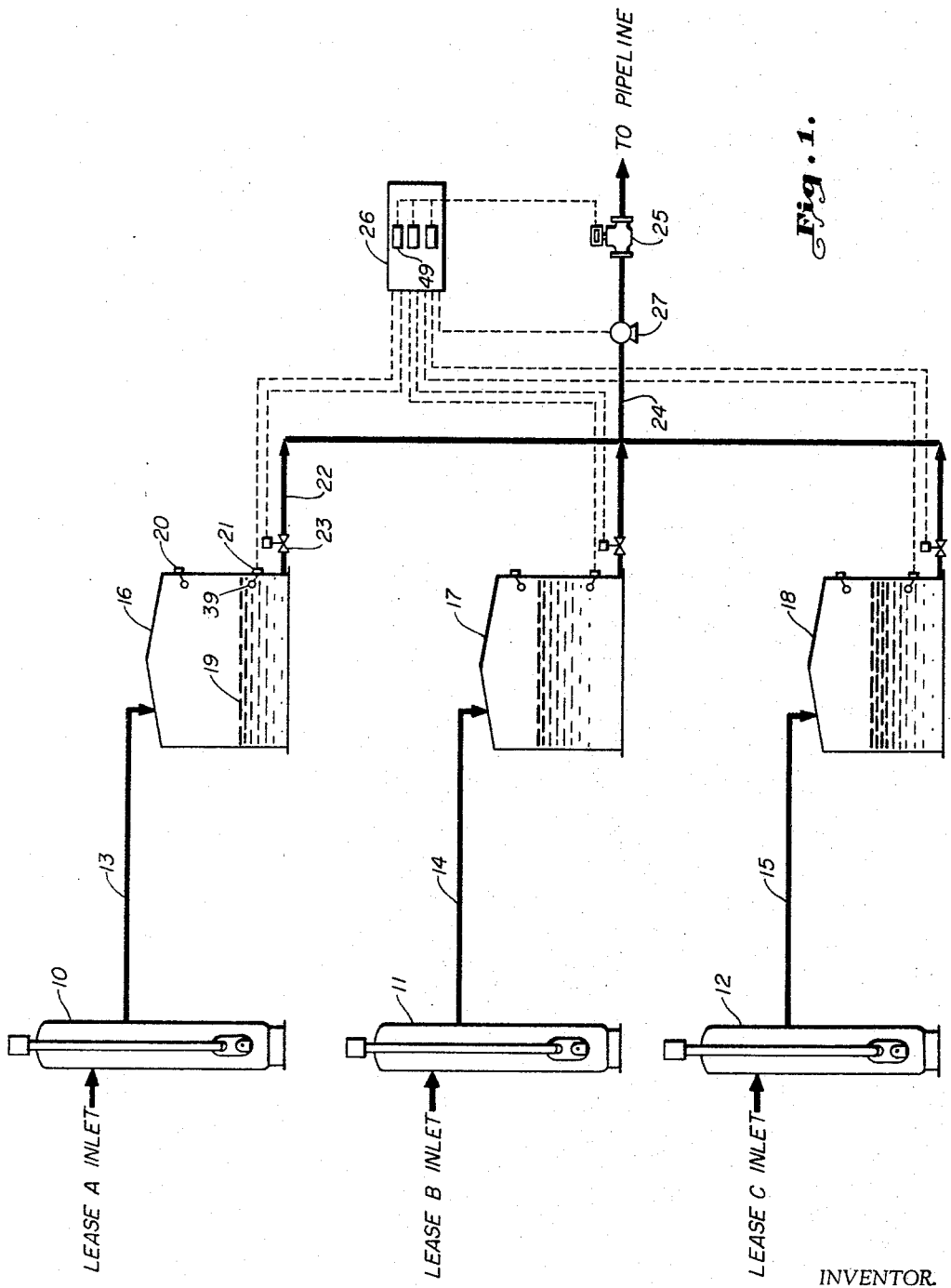

United States Patent Office 3,322,135
Patented May 30, 1967

3,322,135
SYSTEM FOR ENSURING ACCURATE MEASUREMENT ALLOCATION OF FLUID
Walter Thomas Watson, Tulsa, Okla., assignor to Combustion Engineering, Inc., New York, N.Y., a corporation of Delaware
Filed Sept. 23, 1964, Ser. No. 398,542
6 Claims. (Cl. 137—113)

The present invention relates to distribution of impulses sent out by a single positive displacement meter of a multi-lease PD/LACT (positive displacement/lease automatic custody transfer) unit for oil. More specifically, the invention allocates metered volumes of oil from each of multiple leases, passing through the common meter, to the proper register for each lease.

It is necessary to obtain an accurate record of the oil from each of a number of leases when their oil is comingled. Only with such information can the profits from the sale of the comingled oil be accurately divided. There may be other reasons for allocation of the production, but the division of profits is reason enough.

The general problem of running all the oil from various leases through a common meter and actuating a separate register for each lease is easy to understand. There is the transfer system to be actuated and the registers to be concomitantly actuated. A more specific problem descends when the transfer systems are switched from one lease to another while the common meter is passing a unit of oil from the one lease and before the unit of oil is properly registered for that lease. When the switch is made in this production interval of the meter from the one lease, inaccurate allocation results in the registration.

An object of the present invention is to prevent interruption of oil transfer from a specific lease until delivery of a complete unit of the oil and manifestation of a total including the complete unit.

Another object is to positively latch a transfer system into operative position until the delivery and registration of a unit of oil transferred from a specific source and then break the latch to check the existence of the index of demand for the oil to be transferred and the existence of the index of available quantity of the oil for transfer to initiate delivery and registration of another unit of the oil.

The present invention contemplates a system which will control the positive transfer of oil from a lease and terminate transfer when no oil is available and/or a predetermined program dictates termination of trnasfer. Once the system is placed in operative condition for transfer, a latching system positively holds the transfer system in the delivery condition. The positive displacement meter through which the oil passes is connected to actuate a system which establishes a first signal for each unit metered, the first signal being of definite duration. A system controlling the power to the latching system is controlled by the first signal, the first signal establishing a second signal in the system controlling the power to the latching system for a definite time period after the time period of the first signal. Therefore, the system controlling the positive transfer of material is returned to the control of means responsive to an index of available oil and/or the program after each unit of oil is measured and manifested, and only after each unit is completely measured and manifested.

The present invention more specifically contemplates a first electric circuit actuated by the common meter of a multi-lease PD/LACT unit to provide only one pulse of short definite duration for each closure of the meter switch. A second electric circuit is connected to the first circuit for operation to check the transfer circuit and determine if it is programmed to shift to the next lease. If shifting to the next lease is dictated, the shift of the transfer system is delayed until after the meter pulse and the registration of that pulse is completed. Therefore, all the oil production represented by the pulse is from the lease selected and the shift to the next lease is made before appreciable oil can flow from the former lease.

The invention is illustrated as embodied in two basic electric networks. The first network is controlled by a multi-cam repeating cycle timer. In this first network the second, checking, electric circuit functions once per barrel to interrupt the overriding latching circuit provided.

The second network is controlled by a multi-deck stepping switch. Signals to shift the stepping switch are blocked until the second, checking, circuit operates at the end of each pulse. Both networks provide the same basic result of delaying any shift of the transfer system from one lease to another until complete units of oil are transferred and properly registered for the lease from which the oil is transferred.

Figure 2:
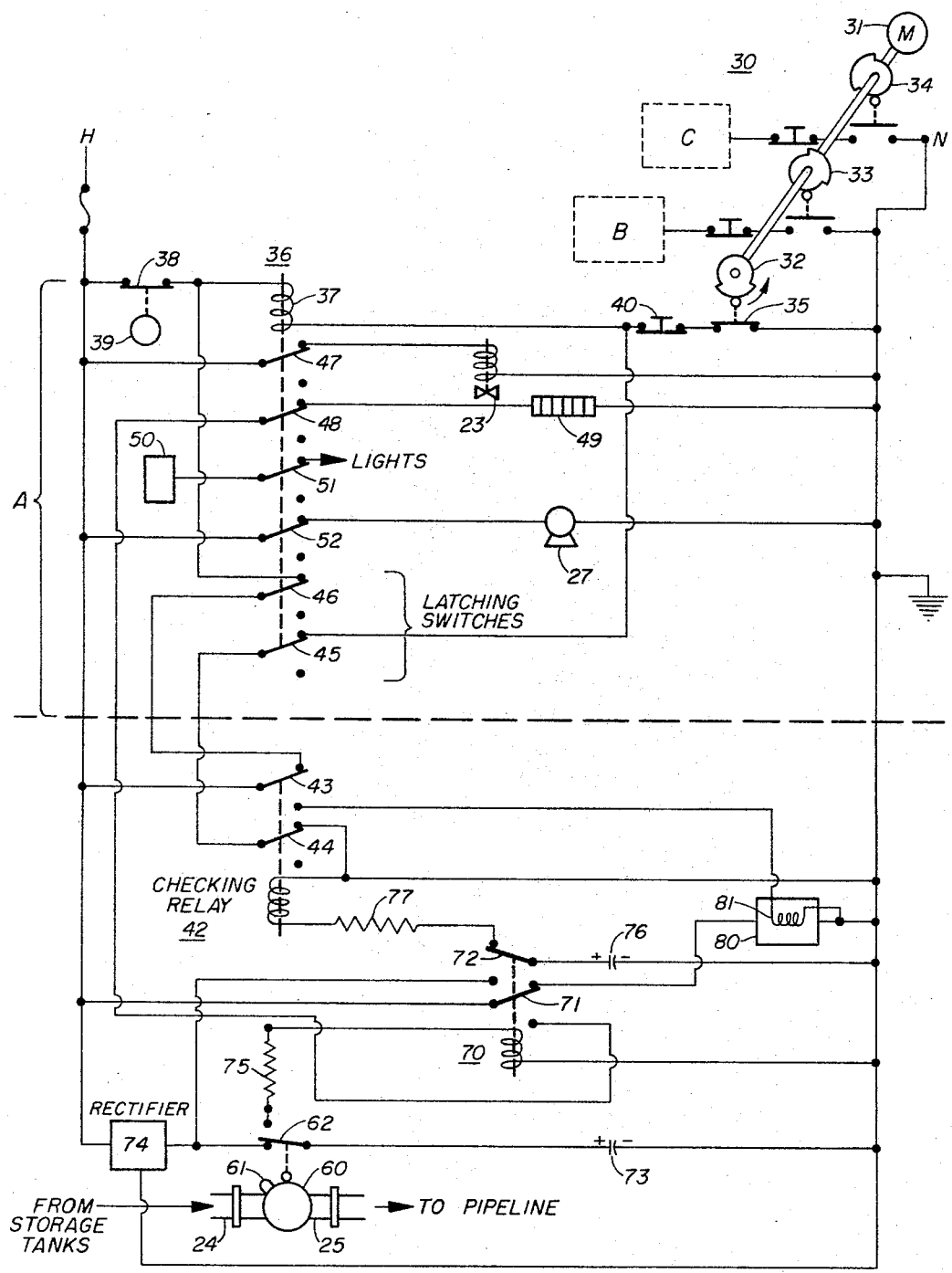

Other objects, advantages and features of this invention will become apparent to one skilled in the art upon consideration of the written specification, appended claims, and attached drawings, wherein:

FIG. 1 is a diagrammatic representation of a lease automatic custody transfer system employing a single position displacement meter and embodying the present invention; and FIG. 2 is a wiring diagram of a circuit for the system of FIG. 1 using multi-cam repeating cycle timer to shift the transfer operation from one lease to the next.

Referring to FIG. 1, there is illustrated a multi-lease PD/LACT in association with field processing equipment receiving well streams and depositing oil in storage tanks from which tanks delivery is then made to a pipeline purchaser. Specifically, production from three leases is received into the system. Three leases support the concept of any number of leases being tied together in this system which embodies the present invention. The invention is not to be regarded as limited in any way to a specific number of leases.

Arbitrarily, the leases are designated A, B and C. The inlets to the system are legended and designated in FIG. 1 as taking their production to individual treaters 10, 11 and 12. These treaters merely represent any of a number of possible surface equipment units which prepare raw production for sale to a pipeline organization. Each lease offers its own problems and the equipment to handle particular production is tailored to the requirements of that lease and the specifications of the pipeline as a customer. For the present disclosure, only the outline of the well-known vertical heater-treater is used to symbolize the surface equipment which delivers merchantable oil through conduits 13, 14 and 15 and to storage tanks 16, 17 and 18.

It is emphasized that I am well aware of the necessity for much piping and valving for the disclosed system to complete the cycle of operation, much of this piping and valving not being shown here. The disclosure has been carefully formed to show only those conduits, valves, controls, etc. which either directly embody some part of the invention or give support to the concepts of the invention.

Storage tank 16, as the representative of all three of the tanks, has a level detector for indicating when tank 16 is full and a level detector for indicating when a predetermined minimum level is reached by the oil deposited in the tank from conduit 13. In FIG. 1, level 19 of the oil in tank 16 is between high-level detector 20 and low-level detector 21. Level 19 is lower than the levels in tanks 17 and 18 which signifies that oil is being withdrawn from tank 16 through conduit 22. A valve 23 is in conduit 22.

Asumming valve 23 to be open, oil is flowing through conduit 22 into conduit 24. Positive displacement meter 25 responds to the flow of oil through conduit 24, actuating a register to exhibit the quantity of oil withdrawn from tank 16.

Meter 25 is common to all the leases; all the oil flows from the several tanks through meter 25. Oil is withdrawn from each tank in turn as dictated by the structure in which the present invention is embodied. The central location for the embodying structure is at 26. All information on quantity of oil available, and all control actions taken in accordance with such data, centers at 26. The over-all result is an accurate registration of the oil run from each storage tank through conduit 24.

It is conventional to provide a means of monitoring the quality of oil passed from storage to the pipeline. This information is provided by well-known detectors and can be used to divert oil, which fails to meet predetermined quality standards, back through the processing unit of the lease. However, it was deemed unnecessary to encumber the drawing with either the monitoring unit or the conduit system necessary to divert the oil back to the entrance to the treaters disclosed in FIG. 1.

Perhaps some clarification is served by illustrating a pump 27 in conduit 24, upstream of meter 25. This pump, in the common manifold, of the transfer system draws oil from each tank as directed by the circuits in control center 26. The subsequent disclosure will indicate actuation of this pump, and the monitor for quality, by switch closure within control center 26. As far as FIG. 1 is concerned, the collection of data into center 26, and the distribution of control actions from center 26, are illustrated by dashed lines.

Section 26

Referring to FIG. 2, station 26 is shown in its various components. Within station 26 there is a basic relay for each lease. This so-called lease relay is placed under the control of the quantity of stored oil to be transferred and a programming device which demands transfer from each lease during predetermined periods.

When considering FIG. 2, be aware that there is a separate lease relay for each lease A, B and C. The relay for lease A is shown in detail, actuated by the float of tank 16 and a cam-operated switch of the program control. The lease relays and circuits controlled by the lease relays of leases B and C are indicated by boxes with circuits controled by the program control. In common with all the lease relays is the checking circuit connected to the flow meter in conduit 24. These common units are all shown on the lower part of FIG. 2, to be taken as also connected to the relays of leases B and C within the boxes in the upper right portion of FIG. 2.

The three lease relays are sequentially actuated by the multi-cam repeating cycle timer 30. A motor 31 rotates cams 32, 33 and 34 at the same time. With each cam having a raised profile around one-third of its periphery; the profile actuates a follower. The follower is mechanically attached to a switch through which power is applied to its particular lease relay in station 26.

A more specific explanation demonstrates that cam 32 of lease A opens and closes switch 35. One-third of the profile of cam 32 keeps switch 35 closed while cams 33 and 34 of leases B and C remain open. The result is that the lease relays for leases B and C are not energized while the relay for lease A is energized. Motor 31 continues to rotate; the timer 30, through its cams, sequentially completes the connection of the lease relays with the electrical line supply to energize the lease relays in turn and withdraw oil from the leases on the predetermined program.

Lease relay 36

Lease relay 36 is shown in detail with FIG. 2, its circuits connected to the checking relay and meter 25 which are common to the circuits of the other lease relays. The various components around the lease relay, checking relay and meter which are powered from the line supply are indicated as connected between line H and line N. Further, the devices served by the supply line powered components are indicated diagrammatically, as well as those units which act upon and modify the function of the relays.

All functions in these circuits start with energization of relay 36. Coil 37 of this relay 36 is energized by connecting it across the line supply with cam switch 35 and tank level switch 38. Closure of switch 35 is by cam 32 and closure of switch 38 is by float 39. Incidentally, a manual switch 40 is also provided in this connection across the line. With all these switches closed, relay 36 is energized by the line supply to pull all of its switches up into the energized position shown in FIG. 2.

It is quite possible that in actual practice of the invention, two relays will be required to perform the function of relay 36. A double-throw relay may not be available with a sufficient number of switches. However, for the present disclosure, a single relay 36 is shown, provided with enough switches to function as desired. Whether one or two relays are used, a pair of the switches are utilized to latch their coils to the line supply, once the relay is pulled into the position shown in FIG. 2.

Latching switches 45, 46

Checking relay 42 then comes into the picture. This relay, common to all the lease relays, controls the circuits through the latching switches of lease relay 36. More specifically, relay 42 has two switches 43 and 44 through which the H line and the N line are connected across the coil of relay 36, this connection also being completed through switches 45 and 46 of these relays. These switches 43 and 44 are shown in their up position to complete the power supplied to relay 36. While checking relay 42 is in this position, neither float 39 nor cam 32 can cause these relays to drop to their alternate positions. Only the periodic powering of checking relay 42 will "test" the inability of the capacity control through float 39 and/or the program index through cam 32 to hold relay 36 in its illustrated position.

Remaining switches of relay 36

When each lease relay is energized, its switches complete certain connections to the units of the system. First, transfer valve 23 is opened by switch 47. A solenoid coil of valve 23 is connected across the line supply. The coil may directly open valve 23 or control a source of gas pressure which will open valve 23.

Next, switch 48 connects register 49 to line supply through the pulse circuit. The register circuit will be completed each time a unit of oil passes through meter 25. The full explanation of just when and how this circuit completion is made will follow later.

Should the oil being withdrawn from tank 16 suddenly fall below acceptable standards it will be diverted back to the processing unit 10. Reference has previously been made to this system not shown in detail here. What is shown, in FIG. 2, is a representation of the monitor device which senses the quality of the oil and actuates the diverting valve, or valves, necessary to route the oil from the tank 16 back to treater 10. This monitor device 50 is merely outlined as a box unit and is connected to switch 51 which connects the circuits within the monitor 50 to a system of indicating lights. These lights are actuated to give visual information as to whether the monitor 50 is, or is not, diverting oil back to treater 10.

Finally, there is switch 52 which is in the circuit of the motor for transfer pump 27. Transfer valve 23 is opened by switch 47 and the pump motor is energized through switch 52 at the same time. Therefore, the transfer power is supplied at the same time the source of supply is designated.

Latch power interruption

It is a fundamental object of the invention to actuate checking relay 42 as soon as a unit (usually a barrel) goes through meter 25. There is shown, in FIG. 2, a plan view of the meter 25 with the head cam 60 mounted on the meter. Lobe 61 on cam 60 actuates switch 62 once every time a unit of oil passes through meter 25 and rotates cam 60.

When switch 62 is actuated, checking relay 42 moves switches 43, 44 to their positions alternate to those shown in FIG. 2. With switches 43, 44 breaking their circuits between relay 36 and the power supply, the program and level in tank A is checked. If float 39 has opened switch 36 and/or cam 32 has opened switch 35, the interruption of the latch power to the switches 45 and 46 will de-energize the lease relay 36 and the entire transfer system will shut down until the cam timer 30 selects a new lease with a satisfactory level of oil to run.

The periodic checking of the energization of the lease relay 36 through the quantity controlled switch 38 and the program controlled switch 35 is carried out in a particular way to conform to the principles of the present invention. This checking action must occur at the finish of the electrical sequence created by the actuation of switch 62. In this way, there is no possibility of de-energizing the lease relay 36 before the electrical signal of switch 62 has been routed through the relay 36. The lease relay may drop out after the signal, but not before a full unit has passed through meter 25 and that full unit applied to the register of the lease from which the unit of oil has been drawn.

Pulse circuits

Reference has been made to an electrical signal created by actuation of switch 62. More specifically, this signal is disclosed here as a direct current voltage applied to relay 70.

This D.-C. voltage generated is of finite duration and causes switches 71 and 72 to be moved to their alternate positions for the period of time set. The time is set by having switch 62 normally connect capacitor 73 to a source 74 of D.-C. voltage and then discharging the capacitor 73 through resistance 75 to energize the coil of relay 70. In the actual reduction to practice, a time of 1.5 to 2 seconds was adequate.

Switch 72 of relay 70 alternately connects capacitor 76 to source 74 and discharges it through resistor 77 to energize checking relay 42. This combination of capacitor 76 and resistor 77 also establishes a finite time for energization of relay 42. A time of 1.5 to 2 seconds was adequate in the actual reduction to practice.

These pulse circuits may be said to have the primary function of actuating checking relay 42 after the duration of the first signal created by moving switch 62 to connect relay 70 to the charge on capacitor 73 through resistance 75. As switch 72 does not discharge capacitor 76 until *after* meter 25 sends out its unit signal, this charge is not applied to checking relay 42, through resistance 77, until after the time period of that signal. Therefore, the latching action is not initiated until after the meter 25 has moved lobe 61 around and tripped switch 62 to result in the energization and de-energization of relay 70.

Another primary function of these pulsing networks may be said to be the actuation of register 49. When relay 70 pulls switch 72 down to charge capacitor 76, it also pulls down switch 71 to connect register 49 across the line supply. This power is routed through switch 48 on relay 36. Therefore, each actuation of switch 62 connects register 49 to the line supply and adds one unit to the total exhibited by the register; no more than one unit can be added to the register per actuation of switch 62.

A secondary function of these pulsing networks is the resetting of the clutch on the meter rate monitor 80. The alternate position of switch 43 on the checking relay 42 connects clutch coil 81 to the line supply. This reverse acting clutch of meter rate monitor 80 resets the timing sequence. Therefore, if any part of the pulsing circuits fails the meter rate timer will not be reset, it will time-out and shut down the transfer pump by a circuit not shown. The meter rate monitor 80 has been energized through the normally de-energized position of contact 71.

Stepping switch programming

The selection of the lease from which oil is to be run has been disclosed as made by multi-cam repeating cycle timer 30. It is also feasible to employ a stepping switch rather than the cam timer 30.

To use a stepping switch, the actuating coil of the switch is arranged in series circuit with the level switch of each lease. As an example, switch 38 is the level switch of lease A. When the stepping switch is at its "lease A" position, its actuating coil is in series with switch 38.

When the stepping switch arrangement is used, the level switch of the lease is closed if the level of oil in the run tank is too low to supply oil. Therefore, when there is not enough oil to run from a particular lease the coil of the stepping switch is energized and the switch moves to the next lease in the sequence.

The checking relay arrangement with the stepping switch is to complete the circuit of the level switch and actuating coil of the stepping switch after each unit of oil has been passed through the meter. If the level switch is also closed, the stepping switch will move to the next lease, seeking a level switch which is open, indicating the availability of oil to be run. The pulsing circuits continue to function in testing the availability of each lease to supply oil, but only after a complete unit has passed through the meter.

Operation

The function of the pulse circuits was heretofore described, concomitantly with their structural disclosure. It would be well to review their function separately to clearly disclose the new results achieved by the invention.

In FIG. 2, the head of meter 25 is shown in a diagrammatic plus view. Essentially the head cam 60 is shown as a rotating member, a member which rotates with the passage of oil through the meter. The rotation of cam 60 brings lobe 61 into contact with switch 62 once every rotation. The gearing between the oil flow and cam 60 is arranged to rotate lobe 62 into engagement with switch 62 once every time a unit (usually a barrel) passes through meter 25. This actuation of switch 62 causing the pulsing circuits to go into action, and only after a unit of oil has passed through the meter 25.

It is to be kept in mind that the mechanical actuation of switch 62 by meter 25 is not the only way of actuating such switch each time a unit passes through the meter. For example, a magnet could be rotated on head cam 60 and actuate a magnetic switch each time the magnet rotated.

After a unit of oil passes through meter 25, relay 70 is actuated by the potential on capacitor 73. This relay 70 then charges capacitor 76. When relay 70 is de-energized, charged capacitor 76 is then connected to checking relay 42 and this relay 42 breaks the circuit of the latching switches on lease relay 36 for the test of the circuit of that relay. Therefore, the delivery circuit is checked for capability and designation each time it delivers a unit of oil, but only after each unit is delivered.

Finally, note that the unit of oil delivered is registered right after the complete unit passes through meter 25 and before the checking takes place. When relay 70 is energized, its switch 71 connects register 49 to the line supply to add one unit to the total exhibited on register 49. Then the check of lease relay 36 is made. The lease relay 36 may fall out, de-energize, because of level switch 38 being open, or switch 35 being opened by timer 30, but the unit of oil which has passed from the lease, through meter 25, will be registered. Thereafter, before an appreciable amount of oil can pass through meter 25, the lease is checked by the pulsing circuits for its capacity to deliver at least a full additional unit of oil. If it fails this check, lease relay 36 is de-energized and nothing further happens until a new lease proves its capacity to continue the delivery of oil.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A system for controlling and manifesting the metering of flowing material from a source of supply to a point of use, including,
  a set of relay contacts operative to direct flow of the material from the source and move the material to the point of use,
  a first circuit arranged to apply power to position the set of relay contacts, the circuit being initially completed through a switch responsive to the amount of material at the source and a switch operated in accordance with a program for moving the material from the source,
  a set of latching contacts in the set of relay contacts through which the set of relay contacts is powered to be maintained in its operative position regardless of the subsequent positions of the source switch and program switch,
  a meter receiving the material from the source as it flows to the point of use,
  a second circuit attached to the meter and arranged to establish an electrical pulse for a predetermined length of time for each unit of material flowing through the meter,
  a third circuit connected to the second circuit and arranged to estabilsh an electrical pulse for a predetermined length of time after each pulse of the second circuit,
  and a checking relay operated by the third circuit to interrupt the power through the latching contacts for the predetermined length of time of the pulse of the third circuit to return the first circuit to control of the source switch and program switch immediately after the unit measured by the meter has been manifested and before appreciable flow through the meter can occur.

2. A system for control of the transfer of liquid from a point of collection to a point of use, including,
  a first electric power circuit completed through a switch which is closed for so long as a predetermined minimum amount of liquid is at the point of collection and a switch which is closed for so long as there is a demand for the liquid,
  a set of relay contacts which are positioned by the completed first electric power circuit to carry out transfer of the liquid from the point of collection,
  a set of latching contacts positioned when the set of relay contacts is positioned by the completed first electric power circuit to complete an electrical connection with the set of relay contacts which will maintain the set in its operative position should either the collection switch or demand switch be opened while the set of latching contacts is positioned closed,
  a meter connected to receive the liquid as it flows from the supply and establish a first electrical signal of definite length for each unit of the liquid which passes through the meter,
  a second circuit connected to the meter to receive the first signal and establish a second electrical signal of definite length after the duration of the first signal,
  and a checking relay connected to the second circuit so as to control power to the set of latching contacts, the checking relay responding to the second electrical signal to break the electrical connection with which the set of latching contacts maintains the relay contacts in their operative position,
  whereby the completion of the first electric power circuit through the collection switch and demand switch is ascertained, the set of relay contacts falling out of the position with which they carry out transfer of the liquid from the point of collection if the first electric power circuit is not completed.

3. A system for controlling and manifesting the quantity of flowing material from a source of supply to a point of use, including,
  a first circuit completed through a switch closed as long as there is material at the source for flowing to the point of use and a switch closed as long as there is demand at the point of use for the material from the source,
  a first relay energized by the completed first circuit,
  a valve connected to a switch of the first relay to control flow of material from the source,
  a register connected to a switch of the first relay to totalize the units of material passed through the valve,
  a set of latching switches of the first relay to complete the connection of the first relay to a source of supply in parallel to the first circuit when the first relay is energized from the first circuit,
  a second relay with switches in series with the latching switches,
  a second circuit connecting the second relay to a pulse source of electrical power for a predetermined length of time,
  and a meter connected to the source to pass material to the point of use and connected to the second circuit to complete the connection between the second circuit and the pulse source each time a unit of flowing material passes through the meter.

4. A pulse circuit for testing the operativeness of a transfer circuit for flowing material, including,
  a meter passing the flowing material to a point of use,
  a first circuit including a capacitor which is normally connected to a source of D.C. voltage and actuated by the meter for alternate connection to a relay,
  a first relay connected to the first circuit to be energized by connection to the capacitor each time a unit of material flows through the meter to the point of use,
  a second relay connected to a supply source through means responsive to quantity of the flowing material available and means responsive to demand for the material,
  self-latching contacts of the second relay through which the second relay is connected to the supply source independently of the quantity means and demand means,
  and a second circuit controlling the connection of the second relay to the supply source through the self-latching contacts and controlled by the first relay so as to be broken each time the meter passes a unit of flowing material,
  whereby the connection of the second relay to the supply source is tested for completion through the quantity means and demand means.

5. A checking circuit for a transfer system which delivers oil from a number of storage tanks to a purchaser through the same meter, including,
  an electrical relay for each tank with an actuating circuit arranged for connection to a source of electrical power, a first switch through which the circuit of each tank relay is completed and arranged to be actuated by a predetermined minimum level of oil to be transferred from that tank, a second switch through which the circuit of each tank relay is completed and arranged to be actuated when a subsequent tank relay is energized for transfer of oil from its tank, a first set of switches operated by each tank relay and arranged in a circuit with the source of electrical power and the tank relay to maintain the relay in the position assumed by the relay when it is energized to transfer oil from its tank although the first and second switches in the relay circuit may be subsequently actuated to move the relay to the position it assumes when it is de-energized, an electrical checking relay with switches arranged in the circuits of the first set of switches in all the tank relays to periodically interrupt the function of the circuits in their connecting the tank relays to the source of power, a first capacitor charged from a source of direct current voltage and connected to energize the checking relay, a pulse relay with a first switch connecting the first capacitor alternately to its charging source and the checking relay to energize the checking relay, a meter through which the oil of all the tanks is passed and actuating a switch after each unit of oil passes through the meter to connect the pulse relay to a source to an energizing source for a preedetermined period of time, whereby the pulse relay energizes the checking relay after each unit of oil passes through the meter to test the circuits completed through the first set of switches of the tank relay in their capability to cause the subsequent tank relay to be energized, and a second set of switches operated by each tank relay when it is energized to divert oil of its tank through the meter and connect a register to the source of supply to add a unit of oil to its total after the unit of oil has passed through the meter.

6. The checking circuit of claim 5 including, a monitor unit which will shut down a pump transferring oil from each tank through the meter after a predetermined period of time, a clutch arranged to connect the monitor to reset its predetermined period of time, and a second switch actuated by the pulse relay to connect the clutch to a supply of power each time the pulse relay is actuated to prevent the monitor from shutting down the pump so long as the pulse relay is connected to the source by the meter within the predetermined time-out period of the monitor.

References Cited
UNITED STATES PATENTS 2,962,894  12/1960  Banks _____ 73—195
3,107,526  10/1963  Kuntz _____ 73—195

WILLIAM F. O'DEA, *Primary Examiner.*

WILLIAM H. WRIGHT, *Assistant Examiner.*